(12) United States Patent
Zhang et al.

(10) Patent No.: US 12,265,790 B2
(45) Date of Patent: Apr. 1, 2025

(54) METHOD FOR CORRECTING TEXT, METHOD FOR GENERATING TEXT CORRECTION MODEL, DEVICE

(71) Applicant: BEIJING BAIDU NETCOM SCIENCE TECHNOLOGY CO., LTD., Beijing (CN)

(72) Inventors: Ruiqing Zhang, Beijing (CN); Zhongjun He, Beijing (CN); Hua Wu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 290 days.

(21) Appl. No.: 18/053,034

(22) Filed: Nov. 7, 2022

(65) Prior Publication Data
US 2023/0090625 A1 Mar. 23, 2023

(30) Foreign Application Priority Data
Nov. 15, 2021 (CN) .......................... 202111350558.9

(51) Int. Cl.
*G06F 40/279* (2020.01)
*G06F 40/166* (2020.01)

(52) U.S. Cl.
CPC .......... *G06F 40/279* (2020.01); *G06F 40/166* (2020.01)

(58) Field of Classification Search
CPC .... G06F 40/279; G06F 40/289; G06F 40/232; G06F 40/166; G06F 40/216; G10L 15/18; G10L 15/01; G06N 3/08
See application file for complete search history.

(56) References Cited

U.S. PATENT DOCUMENTS 10,586,556 B2 * 3/2020 Caskey ................. G09B 19/04
11,024,287 B2 * 6/2021 Yao ......................... G10L 15/18
(Continued)

FOREIGN PATENT DOCUMENTS

| CN | 110765772 A | 2/2020 |
| CN | 111192586 A | 5/2020 |

(Continued)

OTHER PUBLICATIONS

Manar Alkhatib, Azza Abdel Monem, Khaled Shaalan, "Deep Learning for Arabic Error Detection and Correction", : Aug. 2020, ACM Trans. Asian Low-Resour. Lang. Inf. Process., vol. 19, No. 5, Article 71. (Year: 2020).*

(Continued)

*Primary Examiner* — Paras D Shah
*Assistant Examiner* — Nadira Sultana
(74) *Attorney, Agent, or Firm* — Hodgson Russ LLP

(57) ABSTRACT

Disclosed are a method for correcting a text, an electronic device and a storage medium. The method includes: acquiring a text to be corrected; acquiring a phonetic symbol sequence of the text to be corrected; and obtaining a corrected text by inputting the text to be corrected and the phonetic symbol sequence into a text correction model, in which, the text correction model obtains the corrected text by: detecting an error word in the text to be corrected, determining a phonetic symbol corresponding to the error word in the phonetic symbol sequence, and adding the phonetic feature corresponding to the phonetic symbol behind the error word to obtain a phonetic symbol text, and correcting the error word and the phonetic feature in the phonetic symbol text to obtain the corrected text.

8 Claims, 7 Drawing Sheets

(56) References Cited

U.S. PATENT DOCUMENTS

| | | | |
|---|---|---|---|
| 11,568,761 B2* | 1/2023 | Kobashikawa | G09B 5/04 |
| 11,823,659 B2* | 11/2023 | Reinspach | G10L 15/01 |
| 11,935,523 B2* | 3/2024 | Diment | G06N 3/08 |
| 2016/0179774 A1* | 6/2016 | McAteer | G06F 40/232 |
| | | | 704/9 |
| 2020/0184953 A1 | 6/2020 | Yao | |
| 2021/0248309 A1 | 8/2021 | Zhang et al. | |

FOREIGN PATENT DOCUMENTS

| | | | | | |
|---|---|---|---|---|---|
| CN | 113095067 A | * | 7/2021 | | G06F 40/232 |
| CN | 113255331 A | * | 8/2021 | | G06F 40/289 |
| CN | 111192586 B | * | 7/2023 | | G10L 15/18 |
| GB | 2533370 A | | 6/2016 | | |
| KR | 20090028219 A | * | 3/2009 | | G06F 40/232 |

OTHER PUBLICATIONS

Li Yang, Ying Li, Jin Wang, Zhuo Tang, "Post Text Processing of Chinese Speech Recognition Based on Bidirectional LSTM Networks and CRF", Electronics 2019, MDPI, Oct. 2019, (Year: 2019).*
Zhang et al., "Correcting Chinese Spelling Errors with Phonetic Pre-training," Findings of the Association for Computational Linguistics: ACL-IJCNLP, 2021.
JPO, Office Action for JP Application No. 2022-169806, Dec. 19, 2023.
EPO, Extended European Search Report for EP Application No. 22206102.0, Mar. 14, 2023.

* cited by examiner

METHOD FOR CORRECTING TEXT, METHOD FOR GENERATING TEXT CORRECTION MODEL, DEVICE

CROSS REFERENCE TO RELATED APPLICATION

This application claims priority to Chinese Patent Application No. 202111350558.9 filed on Nov. 15, 2021, the entire disclosure of which is incorporated herein by reference.

TECHNICAL FIELD

The disclosure relates to natural language processing (NLP) and deep learning (DL) in the field of artificial intelligence (AI) technologies, and particularly to a method for correcting a text, a method for generating a text correction model, and a device.

BACKGROUND

At present, a non-autoregressive model is adopted for correction of a Chinese speech recognition result.

However, correction using the non-autoregressive model may not process a varying-length correction, resulting in a relatively low accuracy of a correction result.

SUMMARY

The disclosure provides a method for correcting a text, a method for generating a text correction model, and a device.

According to a first aspect, a method for correcting a text is provided, and includes: acquiring a phonetic symbol sequence of the text to be corrected; and obtaining a corrected text by inputting the text to be corrected and the phonetic symbol sequence into a text correction model, in which, the text correction model obtains the corrected text by detecting an error word in the text to be corrected, determining a phonetic symbol corresponding to the error word in the phonetic symbol sequence, and adding the phonetic feature corresponding to the phonetic symbol behind the error word to obtain a phonetic symbol text, and correcting the error word and the phonetic feature in the phonetic symbol text to obtain the corrected text.

According to a second aspect, a method for generating a text correction model is provided, and includes: acquiring a sample text, a sample phonetic symbol sequence of the sample text, and a target text of the sample text; obtaining a corrected sample text by inputting the sample text and the sample phonetic symbol sequence into a text correction model to be trained, in which, the text correction model to be trained obtains the corrected sample text by detecting a sample error word in the sample text, determining a sample phonetic symbol corresponding to the sample error word in the sample phonetic symbol sequence, and adding a sample phonetic feature corresponding to the sample phonetic symbol behind the sample error word to obtain a sample phonetic symbol text, and correcting the sample error word and the sample phonetic feature in the sample phonetic symbol text to obtain the corrected sample text; generating a first loss value based on the sample text, the corrected sample text, and the target text; and obtaining a text correction model by training the text correction model to be trained based on the first loss value.

According to a third aspect, an electronic device is provided, and includes: at least one processor; and a memory communicatively connected to the at least one processor; the memory is stored with instructions executable by the at least one processor, the instructions are executed by the at least one processor, the at least one processor is caused to perform the method for correcting a text as described in the first aspect of the disclosure or the method for generating a text correction model as described in the second aspect of the disclosure.

It should be understood that, the content described in the part is not intended to identify key or important features of embodiments of the disclosure, nor intended to limit the scope of the disclosure. Other features of the disclosure will be easy to understand through the following specification.

BRIEF DESCRIPTION OF THE DRAWINGS

The drawings are intended to better understand the solution, and do not constitute a limitation to the disclosure.

DETAILED DESCRIPTION

The exemplary embodiments of the present disclosure are described as below with reference to the accompanying drawings, which include various details of embodiments of the present disclosure to facilitate understanding, and should be considered as merely exemplary. Therefore, those skilled in the art should realize that various changes and modifications may be made to the embodiments described herein without departing from the scope and spirit of the present disclosure. Similarly, for clarity and conciseness, descriptions of well-known functions and structures are omitted in the following descriptions.

Artificial Intelligence (AI) is a new science of technology that studies and develops theories, methods, technologies and application systems configured to simulate, extend and expand human intelligence. At present, AI technology is characterized by high automation, high accuracy and low cost, which is widely applied.

Natural Language Processing (NLP) is a computer system that may effectively achieve natural language communication, and especially a science of software system, is an important direction in the field of computer science and artificial intelligence.

Deep Learning (DL) is a new research direction in the field of machine learning (ML) that learns inherent law and representation hierarchy of sample data, and information acquired in the learning process is of great help in interpretation of data such as words, images and sound. Its final goal is that the machine may have analytic learning ability like humans, which may recognize data such as words, images, sound, etc. In terms of specific research contents, it mainly includes a neural network system based on a convolution operation, (that is, a convolutional neural network); a self-encoding neural network based on a multi-layer neuron; and performing pre-training in a multi-layer self-encoding neural network, thereby further optimizing a deep belief network of a neural network weight in combination with authentication information. DL makes many achievements in search technology, data mining, machine learning, machine translation, natural language processing, multimedia learning, voice, recommendation, personalization technology and other related fields. DL enables a machine to imitate human activities such as audiovisual and thinking, which solves many complex pattern recognition difficulties, so that artificial intelligence-related technology makes great progress.

A method and an apparatus for correcting a text, a method and an apparatus for generating a text correction model, a device and a medium are described in combination with figures in embodiments of the disclosure.

Figure 1:
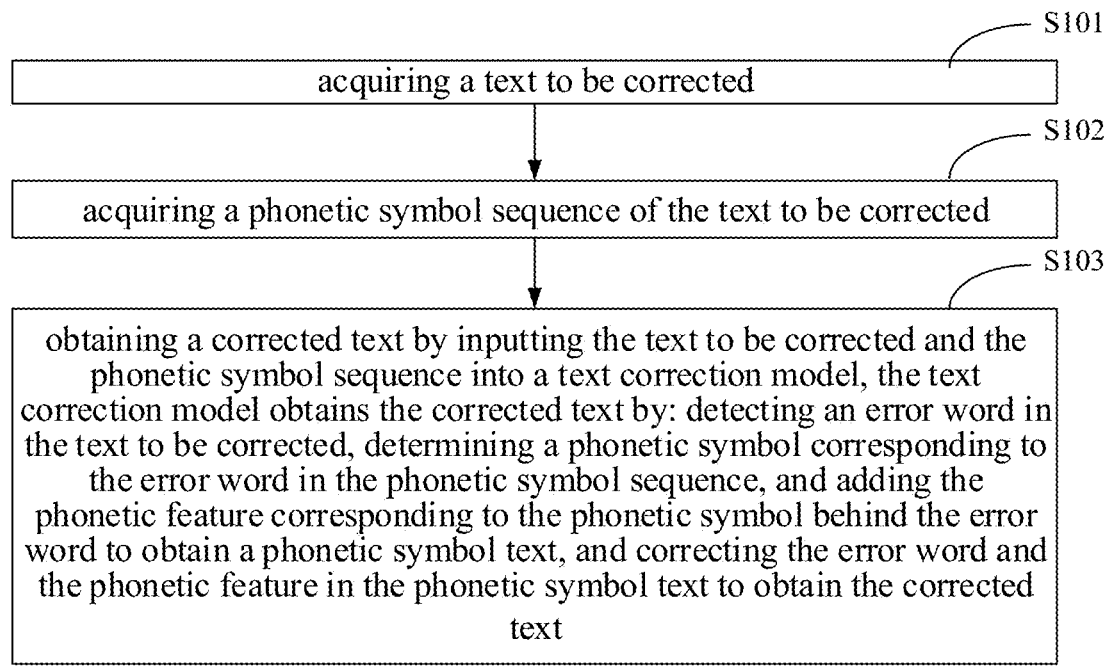
FIG. 1 is a flowchart of a method for correcting a text according to a first embodiment of the disclosure.

FIG. 1 is a flowchart of a method for correcting a text according to a first embodiment of the disclosure.

As illustrated in FIG. 1, the method for correcting a text in the embodiment of the disclosure may specifically include the following blocks.

At S101, a text to be corrected is acquired.

Specifically, an executive body of the method for correcting a text in the embodiment of the disclosure may be an apparatus for correcting a text in the embodiment of the disclosure, and the apparatus for correcting a text may be a hardware device with a data information processing ability and/or a software necessary to drive the hardware device. Optionally, the executive body may include a workstation, a server, a computer, a user terminal and other devices. The user terminal includes but is not limited to a mobile phone, a computer, a smart speech interaction device, a smart appliance, a vehicle-mounted terminal, etc.

It needs to be noted that, the method for correcting a text in the embodiment of the disclosure may be applied to a scene where a Chinese speech recognition result is corrected. Correcting a Chinese speech recognition result may be represented in form as: inputting a sentence including several words, that is a speech recognition result, and then outputting a corrected sentence. However, word numbers of those two sentences, that is, sentence lengths, are not necessarily the same, for example, the length of the corrected sentence may be greater relative to the original sentence. Taking a sentence including n words for an example, $Y=(y_1, y_2, \ldots, y_m)$ may be output by inputting $X=(x_1, x_2, \ldots, x_n)$, in which, n is not necessarily equal to m.

Figure 2:
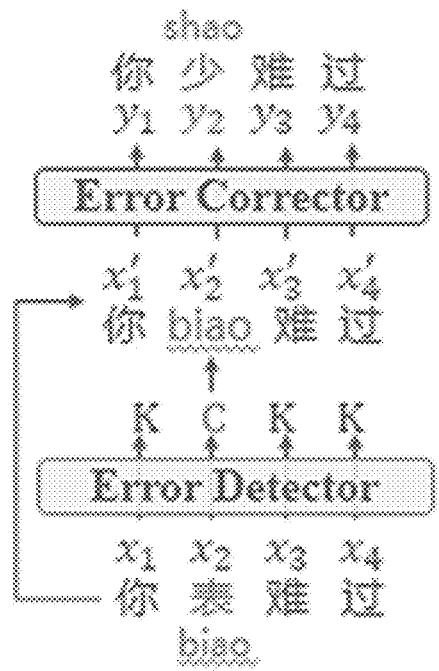
FIG. 2 is a diagram of a Tagging with Phonetics method.

For the above problem, taking correcting a recognition result "你表难过 (You please watch upset)" of the speech "你不要难过 (You please not upset)" for an example, in a conventional correction method based on a non-autoregressive model, as illustrated in FIG. 2, in $y_i$, C represents needing to modify, and K represents needing not to modify. A two-step tagging method is adopted, in which, a first step is to detect a wrong position of the speech recognition result "你表难过", that is, detect an error word "表 (watch)" in the speech recognition result, and a second step is to input the text with the detected error word "表" being replaced with a phonetic symbol "biao", and to correct the text by tagging so as to obtain a corrected text "你少难过 (You please less upset)". However, the method may not process a varying-length correction, that is, the output corrected result must have the same length as the input speech recognition result, that is, having the same word number, but a correction having the same length as the input speech recognition result and close to the pronunciation making the sentence fluent may not be generated, therefore, a strange correction "少 (less)" is generated, resulting in an inaccurate correction result.

Figure 3:
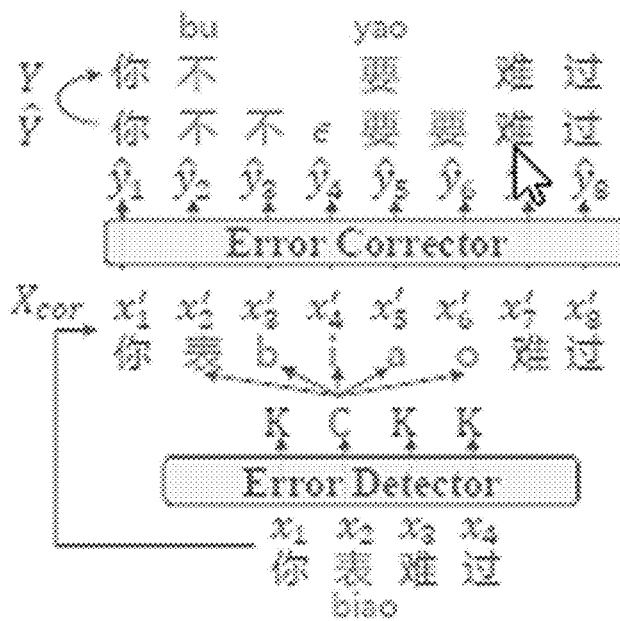
FIG. 3 is a diagram of a non-autoregressive model combined with phonetic symbols.

Based on this, a method for correcting a text is provided in the embodiment of the disclosure. Correction is performed by connecting a phonetic feature of the detected error word behind the error word, which leads to a rapid correction speed. In consideration of pronunciation information, the accuracy of the corrected result is relatively high, and a varying-length correction may be processed, which further improves the accuracy of the corrected result In the embodiment of the disclosure, the text to be corrected is an initial text recognized by speech recognition, and may be acquired through a plurality of clients, including but not limited to a mobile phone, a computer, which is not limited in the disclosure. The text to be corrected may include one sentence, one paragraph, or one chapter, for example, a news manuscript, etc. As illustrated in FIG. 3, for example, the text to be corrected is "你表难过".

At S102, a phonetic symbol sequence of the text to be corrected is acquired.

Specifically, the phonetic symbol sequence corresponding to the text to be corrected is further acquired after acquiring the text to be corrected at S101.

It needs to be noted that, the phonetic symbol sequence is a combined sequence of a phonetic symbol of each Chinese character in the text to be corrected, and is represented in lowercase letters. For example in FIG. 3, the phonetic symbol sequence of the text to be corrected "你表难过" is "ni biao nan guo".

At S103, a corrected text is obtained by inputting the text to be corrected and the phonetic symbol sequence into a text correction model. The text correction model obtains the corrected text by detecting an error word in the text to be corrected, determining a phonetic symbol corresponding to the error word in the phonetic symbol sequence, and adding the phonetic feature corresponding to the phonetic symbol behind the error word to obtain a phonetic symbol text, and correcting the error word and the phonetic feature in the phonetic symbol text to obtain the corrected text.

Specifically; the text to be corrected acquired at block S101 and the phonetic symbol sequence corresponding to the text to be corrected acquired at block S102 are input into a text correction model. The text correction model first detects an error word in the text to be corrected, and determines a phonetic symbol corresponding to the detected error word in the phonetic symbol sequence, and then adds the phonetic feature corresponding to the phonetic symbol behind the error word to obtain a phonetic symbol text, and corrects the error word and the phonetic feature in the phonetic symbol text to obtain the corrected text. For example, the text to be corrected "你表难过" and the corresponding phonetic symbol sequence "ni biao nan guo" are input into the text correction model, and an error detection submodel in the text correction model detects that the error word in "你表难过" is "表", determines that the phonetic symbol corresponding to the error word "表" is "biao" in the phonetic symbol sequence "ni biao nan guo", adds the phonetic feature "b i a o" corresponding to the phonetic symbol "biao" behind the error word "表" to obtain a phonetic symbol text "你表 biao 难过", and inputs the phonetic symbol text "你表 biao 难过" into the text correction model. An error correction submodel in the text correction model corrects the error word "表" and the phonetic feature "b i a o" in the phonetic symbol text "你表 b i a o 难过" to obtain a corrected text "你不要难过".

In summary, with the method for correcting a text in the embodiment of the disclosure, the text to be corrected and the corresponding phonetic symbol sequence are input into a text correction model, the text correction model obtains the corrected text that by detecting an error word in the text to be corrected, determining a phonetic symbol corresponding to the error word in the phonetic symbol sequence, and adding the phonetic feature corresponding to the phonetic symbol behind the error word to obtain a phonetic symbol text, and correcting the error word and the phonetic feature in the phonetic symbol text. In the method for correcting a text in the embodiment, correction is performed by connecting the phonetic feature of the detected error word behind the error word, which leads to a rapid correction speed. In consideration of pronunciation information, the accuracy of the corrected result is relatively high, and a varying-length correction may be processed, which further improves the accuracy of the corrected result.

Figure 4:
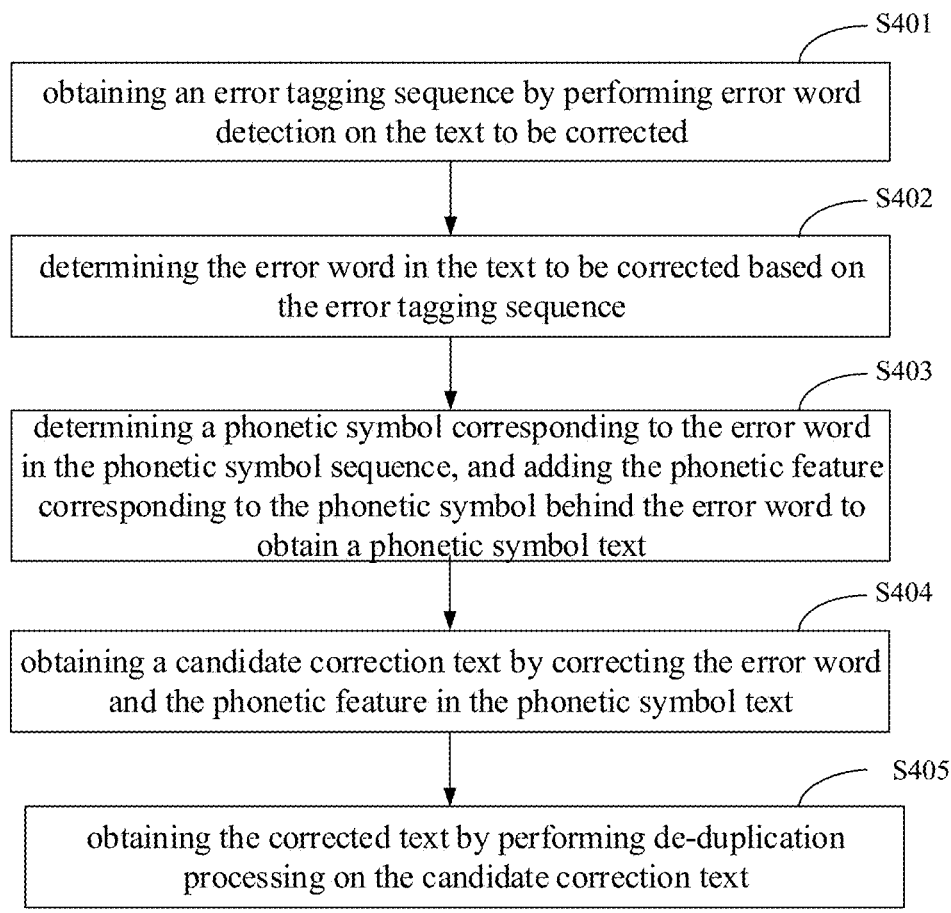
FIG. 4 is a flowchart of a method for correcting a text according to a second embodiment of the disclosure.

FIG. 4 is a flowchart of a method for correcting a text according to a second embodiment of the disclosure.

As illustrated in FIG. 4, on the basis of the embodiment as illustrated in FIG. 1, a text correction model in the method for correcting a text in the embodiment of the disclosure may obtain a corrected text by the following blocks.

"Detecting an error word in the text to be corrected" at block S103 in the embodiment specifically may include the following blocks S401-S402.

At S401, an error tagging sequence is obtained by performing error word detection on the text to be corrected.

Specifically, the text correction model performs error word detection on the text to be corrected acquired at block S101, to obtain the error tagging sequence corresponding to the text to be corrected. For example, in FIG. 3, the error detection submodel in the text correction model performs error word detection on the text to be corrected "你表难过", to obtain an error tagging sequence "K C K K", in which, C represents needing to modify, and K represents needing not to modify.

At S402, the error word in the text to be corrected is determined based on the error tagging sequence.

Specifically, the text correction model may further determine a corresponding error word in the text to be corrected based on the error tagging sequence of the text to be corrected acquired at block S401. For example, in FIG. 3, the text correction model may determine, in the text to be corrected "你表难过" Exit "表", the word "&" corresponding to C in the error tagging sequence "K C K K" as an error word.

At S403, a phonetic symbol corresponding to the error word in the phonetic symbol sequence is determined, and the phonetic feature corresponding to the phonetic symbol is added behind the error word to obtain a phonetic symbol text.

Specifically, the text correction model determines a phonetic symbol corresponding to the error word in the phonetic symbol sequence based on the phonetic symbol sequence of the text to be corrected acquired at block S102 and the error word in the text to be corrected acquired at block S402, and then adds the phonetic feature corresponding to the phonetic symbol behind the error word, to obtain a corresponding phonetic symbol text. The specific process refers to the related description at block S103, which will not be repeated here.

"Correcting the error word and the phonetic feature in the phonetic symbol text to obtain the corrected text" at block S103 in the above embodiment specifically may include the following blocks S404-S405.

At S404, a candidate correction text is obtained by correcting the error word and the phonetic feature in the phonetic symbol text.

Specifically, the text correction model may obtain the candidate correction text by correcting the error word and the phonetic feature of the phonetic symbol text acquired at block S603. For example, in FIG. 3, the error correction submodel in the text correction model may obtain a candidate correction text "你不不ε要要难过" by correcting the error word "表" and the phonetic feature "b i a o" in the input phonetic symbol text "你表 biao 难过".

At S405, the corrected text is obtained by performing de-duplication processing on the candidate correction text.

Specifically, the text correction model obtains a corresponding corrected text by performing de-duplication processing on the candidate correction text acquired at block S404. For example, in FIG. 3, the text correction model obtains a corrected text "你不要难过" by performing de-duplication processing on the candidate correction text "你不不ε要要难过".

In summary, with the method for correcting a text in the embodiment of the disclosure, the text to be corrected and the corresponding phonetic symbol sequence are input into a text correction model, the text correction model obtains a corrected text by performing error word detection on the text to be corrected to obtain an error tagging sequence, determining an error word in the text to be corrected based on the error tagging sequence, determining a phonetic symbol corresponding to the error word in the phonetic symbol sequence, and adding a phonetic feature corresponding to the phonetic symbol behind the error word to obtain a phonetic symbol text, correcting the error word and the phonetic feature in the phonetic symbol text to obtain a candidate correction text and performing de-duplication processing on the candidate correction text. In a method for correcting a text in the embodiment, correction is performed by connecting the phonetic feature of the detected error word behind the error word, which may lead to a rapid correction speed. In consideration of pronunciation information, the accuracy of the corrected result is relatively high, and a varying-length correction may be processed, which further improves the accuracy of the corrected result. At the same time, the phonetic symbol corresponding to the error word in the phonetic symbol sequence is determined by performing error word detection on the text to be corrected and the corrected text is obtained by correcting and performing de-duplication processing, which avoids repetition in a corrected result, and further improves a correction speed and accuracy of the corrected result.

Figure 5:
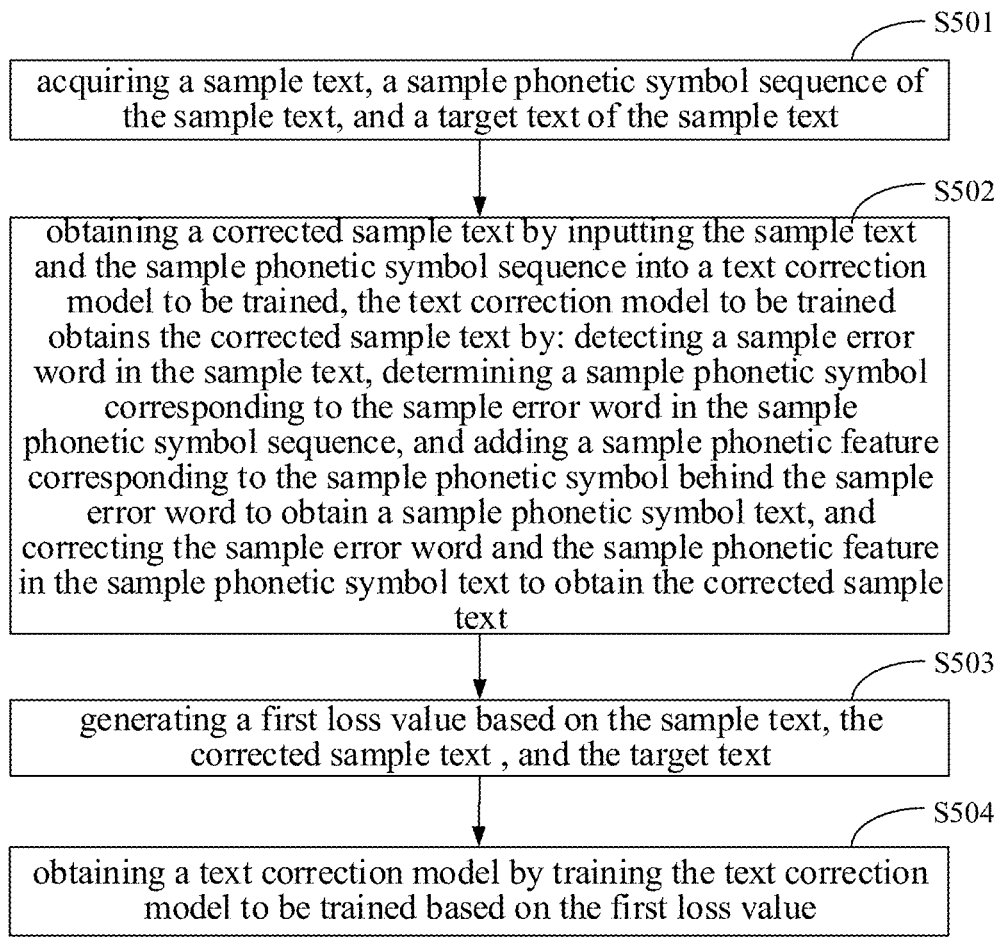
FIG. 5 is a flowchart of a method for generating a text correction model according to a first embodiment of the disclosure.

FIG. 5 is a flowchart of a method for generating a text correction model according to one embodiment of the disclosure. The method for generating a text correction model in the embodiment of the disclosure may be executed by an apparatus for generating a text correction model in the embodiment of the disclosure, to generate the text correction model in the above embodiment.

As illustrated in FIG. 5, the method for generating a text correction model in the embodiment of the disclosure may specifically include the following blocks.

At S501, a sample text, a sample phonetic symbol sequence of the sample text, and a target text of the sample text are acquired.

Specifically, a sample text, a sample phonetic symbol sequence of the sample text, and a target text of the sample text are acquired. The sample text is an initial text recognized by speech recognition and used for training a text correction model to be trained. The sample phonetic symbol sequence is a combined sequence of a phonetic symbol of each Chinese character in the sample text. The target text of the sample text is a real corrected text corresponding to the sample text. The sample text, the corresponding sample phonetic symbol sequence and the target text may be multiple.

At S502, a corrected sample text is obtained by inputting the sample text and the sample phonetic symbol sequence into a text correction model to be trained. The text correction model to be trained obtains the corrected sample text by detecting a sample error word in the sample text, determining a sample phonetic symbol corresponding to the sample error word in the sample phonetic symbol sequence, adding a sample phonetic feature corresponding to the sample phonetic symbol behind the sample error word to obtain a sample phonetic symbol text, and correcting the sample error word and the sample phonetic feature in the sample phonetic symbol text.

Specifically, the sample text and the sample phonetic symbol sequence of the sample text acquired at block S501 are input into the text correction model to be trained. The text correction model to be trained first detects a sample error word in the sample text, determines a sample phonetic symbol corresponding to the sample error word in the sample phonetic symbol sequence, and then adds a sample phonetic feature corresponding to the sample phonetic symbol behind the sample error word to obtain a sample phonetic symbol text, and corrects the sample error word and the sample phonetic feature in the sample phonetic symbol text to obtain a corrected sample text.

At S503, a first loss value is generated based on the sample text, the corrected sample text, and the target text.

Specifically, a first loss value loss1 may be generated based on the sample text acquired at S501, the corrected sample text acquired at S502 and the target text of the sample text acquired at S501, and a specific generation mode of the loss value is not limited in the disclosure.

At S504, a text correction model is obtained by training the text correction model to be trained based on the first loss value.

Specifically, the text correction model to be trained is trained based on the first loss value generated at S503 to optimize model parameters of the text correction model, thereby obtaining an optimized text correction model. The method for generating a text correction model in the embodiment of the disclosure may optimize a text correction model, which may further improve the accuracy of text correction.

In summary, with the method for generating a text correction model in the embodiment of the disclosure, the sample text and the corresponding sample phonetic symbol sequence are input into a text correction model to be trained, the text correction model to be trained obtains a corrected sample text by detecting a sample error word in the sample text, determining a sample phonetic symbol corresponding to the sample error word in the sample phonetic symbol sequence, adding a sample phonetic feature corresponding to the sample phonetic symbol behind the sample error word to obtain a sample phonetic symbol text, and correcting the sample error word and the sample phonetic feature in the sample phonetic symbol text, a first loss value is generated based on the sample text, the corrected sample text, and the target text, and a text correct model is obtained by training the text correction model to be trained based on the first loss value. In the method for generating a text correction model in the embodiment, the corrected sample text is obtained by inputting the sample text and the sample phonetic symbol sequence into the text correction model to be trained, the first loss value is generated based on the corrected sample text and the target text, and the text correction model is obtained by training the model to be trained based on the first loss value. The text correction model has a rapid correction speed. In consideration of pronunciation information, the accuracy of the corrected result is relatively high, and a varying-length correction may be processed, which further improves the accuracy of the corrected result and makes the training of the text correction model more accurate and efficient.

Figure 6:
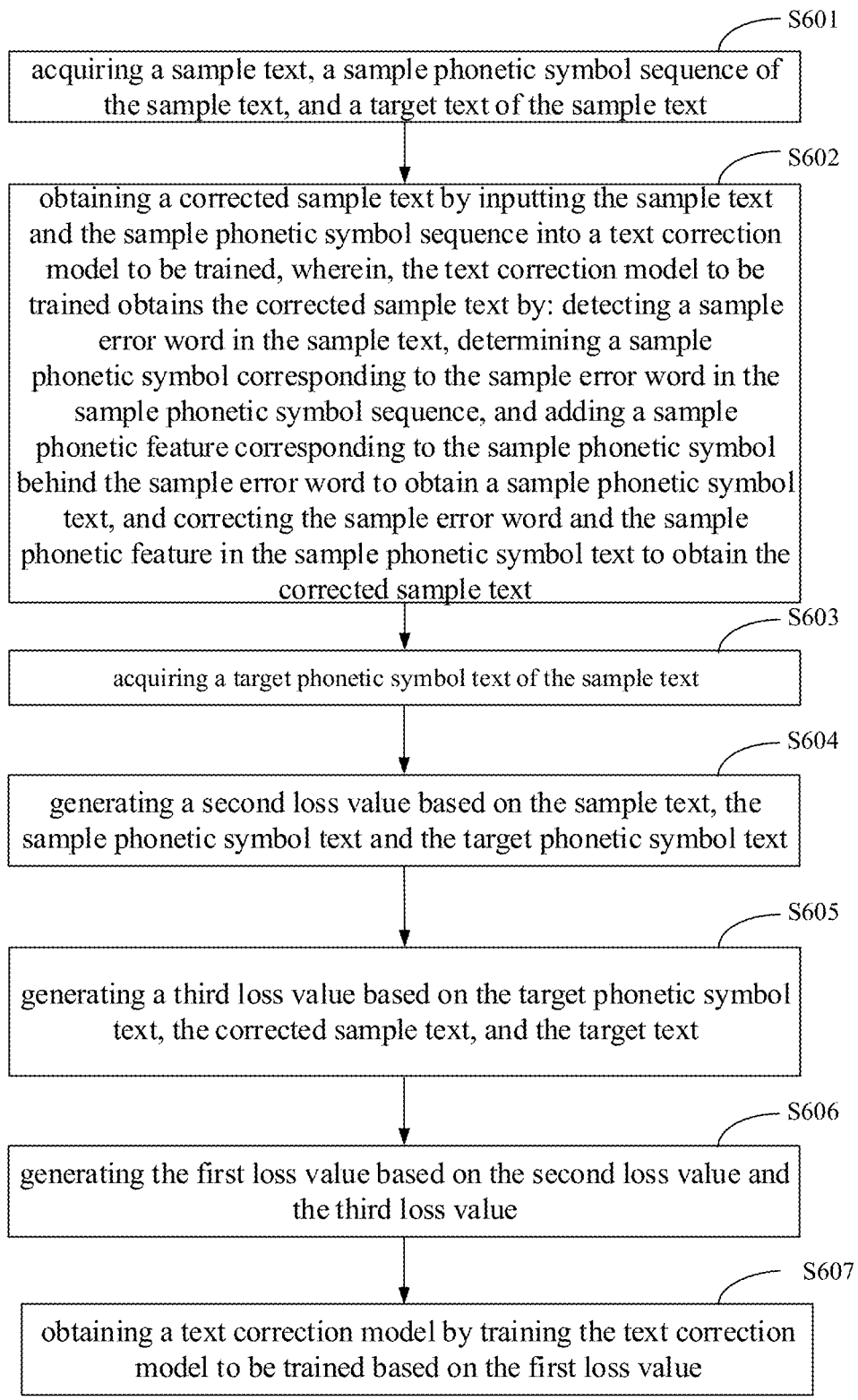
FIG. 6 is a flowchart of a method for generating a text correction model according to a second embodiment of the disclosure.

FIG. 6 is a flowchart of a method for generating a text correction model according to a second embodiment of the disclosure.

As illustrated in FIG. 6, on the basis of the embodiment as illustrated in FIG. 5, the method for generating a text correction model in the embodiment of the disclosure may specifically include the following blocks.

At S601, a sample text, a sample phonetic symbol sequence of the sample text, and a target text of the sample text are acquired.

Specifically, the block S601 in the embodiment is the same as the block S501 in the above embodiment, which will not be repeated here.

The block S502 in the above embodiment may specifically include the following blocks S602.

At S602, the sample text and the sample phonetic symbol sequence are inputted into a text correction model to be trained. The text correction model to be trained performs error word detection on the sample text to obtain a sample error tagging sequence, determines an error word in the sample text based on the sample error tagging sequence, determines a sample phonetic symbol corresponding to the sample error word in the sample phonetic symbol sequence, obtains a sample phonetic symbol text by adding a sample phonetic feature corresponding to the sample phonetic symbol behind the sample error word, obtains a sample candidate correction text by correcting the sample error word and the sample phonetic feature in the sample phonetic symbol text, and obtains a corrected sample text by performing de-duplication processing on the sample candidate correction text.

At S603, a target phonetic symbol text of the sample text is acquired.

Specifically, a target phonetic symbol text of the sample text is acquired. The target phonetic symbol text of the sample text is a real phonetic symbol text corresponding to the sample text.

The block S503 in the above embodiment may specifically include the following blocks S604-S606.

At S604, a second loss value is generated based on the sample text, the sample phonetic symbol text and the target phonetic symbol text.

Specifically, a loss value calculation may be further performed based on the sample text acquired at S601, the sample phonetic symbol text acquired at S602 and the target phonetic symbol text of the sample text acquired at S603 to obtain the second loss value.

At S605, a third loss value is generated based on the target phonetic symbol text, the corrected sample text, and the target text.

Specifically, the third loss value is generated based on the target phonetic symbol text of the sample text acquired at S603, the corrected sample text acquired at S602 and the target text of the sample text acquired at S601.

At S606, a first loss value is generated based on the second loss value and the third loss value.

Specifically, a loss value calculation may be further performed based on the second loss value generated at S604 and the third loss value acquired at S605 to obtain the first loss value.

At S607, a text correction model is obtained by training the text correction model to be trained based on the first loss value.

Specifically, the block S607 in the embodiment is the same as the block S504 in the above embodiment, which will not be repeated here.

In order to describe a calculation process of the above loss values, a structure of the text correction model is described below. Each of the error detection submodel and the error correction submodel in the text correction model includes one encoder and one decoder, and the two submodels share one encoder.

The error detection submodel performs encoding E (corresponding to an encoder) and a binary classification mapping $f_{det}$ (corresponding to a decoder) on a vector representation ($e_w$) of the input sample text X to obtain a binary classification result c', c'∈ {0,1}.

$$p_i = p(c'_i = 1/X) = \text{softmax}(f_{det}(E(e_w)))$$

where, E adopts a Transformer structure, and $f_{det}$ is a fully connected layer.

The loss value corresponding to the error detection submodel is the second loss value, which may be represented as a cross entropy of the sample text X to c':

$$\mathcal{L}_{det} = -\frac{1}{n}\sum_i [c'_i \ln p_i + (1 - c'_i)\ln(1 - p_i)]$$

The error correction submodel performs encoding E (corresponding to an encoder) and one |V| class classification mapping $f_{cor}$ (corresponding to a decoder) on the vector representation ($e_{cor}$) of the input sample phonetic symbol text $X_{cor} = (x_1', x_2', \ldots, x_t')$ to obtain a corrected result $y_i'$, in which, t>n (n is a length of the sample text X), and t-n is the number of the added phonetic features.

$$p(y_i' = V_k | X_{cor}) = \text{softmax}(f_{crt}E(e_{cor}))$$

where, $v_j$ is a jth word in a dictionary.

Figure 7:
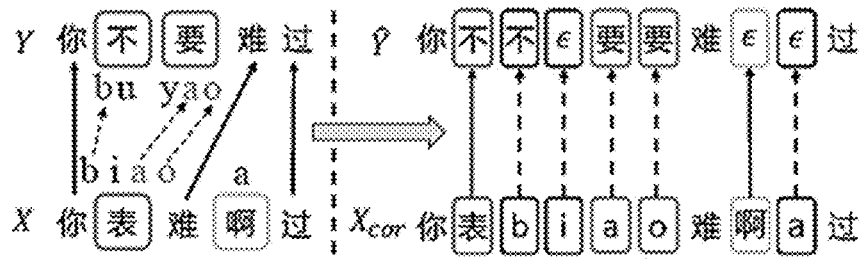
FIG. 7 is a diagram of a process of generating $X_{cor}$ and $\hat{Y}$ from training data (X, Y).

The objective of the correction task is to correct the error correction submodel $X_{cor}$ into a target text Y, however, since the length t of $X_{cor}$ is different from the length m of Y, and Y may not correspond to $X_{cor}$ one to one directly in the tagging task, so that Y needs to be rewritten as $\hat{Y}$, and $\hat{Y}$ has the same length as $X_{cor}$, the cross entropy of $X_{cor}$ to $\hat{Y}$ is used as the third loss value for optimization. The process of rewriting Y as $\hat{Y}$ is illustrated in FIG. 7. First, an error word in the sample text X and a phonetic symbol of the corresponding correct word in Y (as shown on the left side of the vertical dotted line in FIG. 7) are tagged, and then the phonetic features are aligned based on a longest common substring algorithm (as shown by dotted arrows on the left side of the vertical dotted line in FIG. 7). $X_{cor}$ is obtained by connecting the phonetic feature of the error word in X behind the error word. $\hat{Y}$ is obtained based on the phonetic feature alignment relationship on the left side of the vertical dotted line in FIG. 7, as shown on the right side of the vertical dotted line in FIG. 7.

The loss value corresponding to the error correction submodel is the third loss value, which may be represented as a cross entropy of $X_{cor}$ to $\hat{Y}$:

$$\mathcal{L}_{cor} = -\sum_{i=1}^{i} \log(p(y_i' = \hat{y}_i | X_{cor}))$$

The error detection submodel and the error correction submodel in the text correction model are not trained separately but jointly as a whole. The loss value when the text correction model is jointly trained is the first loss value, and calculated by the following formula:

$$\mathcal{L} = \lambda \cdot \mathcal{L}_{det} + (1-\lambda) \cdot \mathcal{L}_{cor}$$

where, $\lambda$ is a predetermined coefficient.

In summary, with the method for generating a text correction model in the embodiment of the disclosure, the sample text and the corresponding sample phonetic symbol sequence are inputted into a text correction model to be trained. The text correction model to be trained performs error word detection on the sample text to obtain a sample error tagging sequence, determines an error word in the sample text based on the sample error tagging sequence, determines a sample phonetic symbol corresponding to the sample error word in the sample phonetic symbol sequence, determines a sample phonetic symbol text by adding a sample phonetic feature corresponding to the sample phonetic symbol behind the sample error word, obtains a sample candidate correction text by correcting the sample error word and the sample phonetic feature in the sample phonetic symbol text, and obtains a corrected sample text by performing de-duplication processing on the sample candidate correction text. A first loss value is generated based on the corrected sample text, and the target text, a target phonetic symbol text of the sample text is acquired, a second loss value is generated based on the sample phonetic symbol text and the target phonetic symbol text, a third loss value is generated based on the first loss value and the second loss value, and the text correction model to be trained is trained based on the third loss value to obtain a text correction model. In the method for generating a text correction model in the embodiment, the corrected sample text is obtained by inputting the sample text and the sample phonetic symbol sequence into a text correction model to be trained, the first loss value is generated based on the corrected sample text and the target text, and the text correction model is obtained by training a model to be trained based on the first loss value. The text correction model has a rapid correction speed. In consideration of pronunciation information, the accuracy of the corrected result is relatively high, and a varying-length correction may be processed, which further improves the accuracy of the corrected result, and makes the training of the text correction model more accurate and efficient. At the same time, the phonetic symbol corresponding to the error word in the phonetic symbol sequence is determined by performing error word detection on the sample text and the corrected sample text is obtained by correcting and performing de-duplication processing, which avoids repetition in a corrected result, and further improves a correction speed and accuracy of the corrected result, and makes the training of a text correction model more accurate and efficient.

Figure 8:
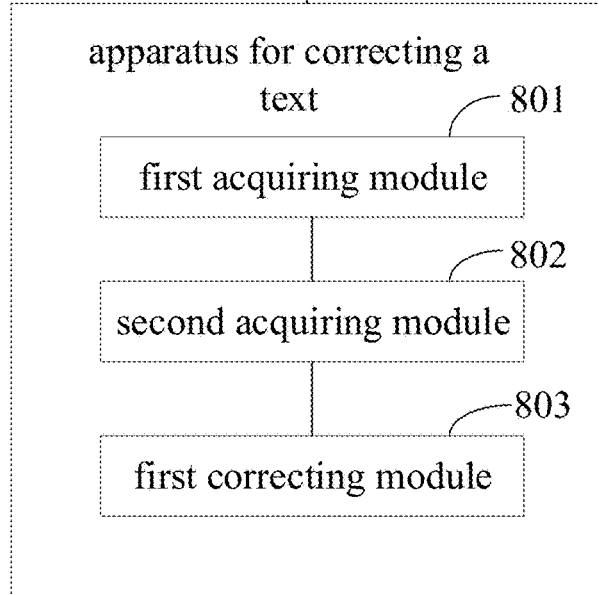
FIG. 8 is a block diagram of an apparatus for correcting a text according to a first embodiment of the disclosure.

FIG. 8 is a block diagram of an apparatus for correcting a text according to a first embodiment of the disclosure.

As illustrated in FIG. 8, the apparatus 800 for correcting a text in the embodiment of the disclosure includes a first acquiring module 801, a second acquiring module 802 and a first correcting module 803.

The first acquiring module 801 is configured to acquire a text to be corrected.

The second acquiring module 802 is configured to acquire a phonetic symbol sequence of the text to be corrected.

The first correcting module 803 is configured to obtain a corrected text by inputting the text to be corrected and the phonetic symbol sequence into a text correction model, in which, the text correction model obtains the corrected text by: detecting an error word in the text to be corrected, determining a phonetic symbol corresponding to the error word in the phonetic symbol sequence, and adding the phonetic feature corresponding to the phonetic symbol behind the error word to obtain a phonetic symbol text, and correcting the error word and the phonetic feature in the phonetic symbol text to obtain the corrected text.

It should be noted that the foregoing explanation of the embodiment of a method for correcting a text is also applied to an apparatus for correcting a text in the embodiment, which will not be repeated here.

In summary, with the apparatus for correcting a text in the embodiment of the disclosure, the text to be corrected and the corresponding phonetic symbol sequence are input into a text correction model, and the text correction model obtains the corrected text by detecting an error word in the text to be corrected, determining a phonetic symbol corresponding to the error word in the phonetic symbol sequence, adding a phonetic feature corresponding to the phonetic symbol behind the error word to obtain a phonetic symbol text, and correcting the error word and the phonetic feature in the phonetic symbol text. In the apparatus for correcting a text in the embodiment, correction is performed by connecting the phonetic feature of the detected error word behind the error word, which may lead to a rapid correction speed. In consideration of pronunciation information, the accuracy of the corrected result is relatively high, and a varying-length correction may be processed, which further improves the accuracy of the corrected result.

Figure 9:
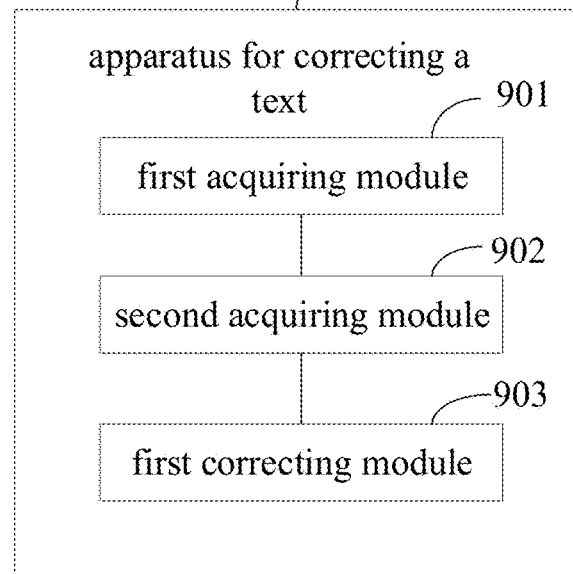
FIG. 9 is a block diagram of an apparatus for correcting a text according to a second embodiment of the disclosure.

FIG. 9 is a block diagram of an apparatus for correcting a text according to a second embodiment of the disclosure.

As illustrated in FIG. 9, the apparatus 900 for correcting a text in the embodiment of the disclosure may include a first acquiring module 901, a second acquiring module 902 and a first correcting module 903.

The first acquiring module 901 has the same structure and function as the first acquiring module 801 in the above embodiment, the second acquiring module 902 has the same structure and function as the second acquiring module 802 in the above embodiment, and the first correcting module 903 has the same structure and function as the first correcting module 803 in the above embodiment.

The text correction model detects an error word in the text to be corrected by: obtaining an error tagging sequence by: performing error word detection on the text to be corrected; and determining an error word in the text to be corrected based on the error tagging sequence.

The text correction model corrects the error word and the phonetic feature in the phonetic symbol text by the followings to obtain the corrected text: obtaining a candidate correction text by correcting the error word and the phonetic feature in the phonetic symbol text; and obtaining the corrected text by performing de-duplication processing on the candidate correction text.

It should be noted that the foregoing explanation of the embodiment of a method for correcting a text is also applied to an apparatus for correcting a text in the embodiment, which will not be repeated here.

In summary, with the apparatus for correcting a text in the embodiment of the disclosure, the text to be corrected and the corresponding phonetic symbol sequence are input into a text correction model, the text correction model obtains a corrected text by performing error word detection on the text to be corrected to obtain an error tagging sequence, determining an error word in the text to be corrected based on the error tagging sequence, determining a phonetic symbol corresponding to the error word in the phonetic symbol sequence, and adding a phonetic feature corresponding to the phonetic symbol behind the error word to obtain a phonetic symbol text, correcting the error word and the phonetic feature in the phonetic symbol text to obtain a candidate correction text and performing de-duplication processing on the candidate correction text. In the apparatus for correcting a text in the embodiment, correction is performed by connecting the phonetic feature of the detected error word behind the error word, which may lead to a rapid correction speed. In consideration of pronunciation information, the accuracy of the corrected result is relatively high, and a varying-length correction may be processed, which further improves the accuracy of the corrected result. At the same time, the phonetic symbol corresponding to the error word in the phonetic symbol sequence is determined by performing error word detection on the text to be corrected and the corrected text is obtained by correcting and performing de-duplication processing, which avoids repetition in a corrected result, and further improves a correction speed and accuracy of the corrected result.

Figure 10:
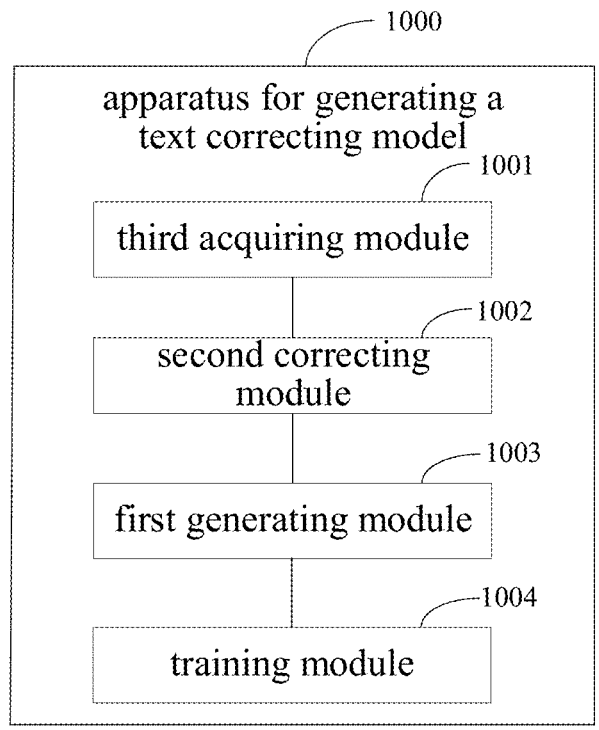
FIG. 10 is a block diagram of an apparatus for generating a text correction model according to a first embodiment of the disclosure.

FIG. 10 is a block diagram of an apparatus for generating a text correction model according to a first embodiment of the disclosure. As illustrated in FIG. 10, the apparatus for generating a text correction model in the embodiment of the disclosure may include a third acquiring module 1001, a second correcting module 1002, a first generating module 1003 and a training module 1004.

The third acquiring module 1001 is configured to acquire a sample text, a sample phonetic symbol sequence of the sample text, and a target text of the sample text.

The second correcting module 1002 is configured to obtain a corrected sample text by inputting the sample text and the sample phonetic symbol sequence into a text correction model to be trained, in which, the text correction model to be trained obtains the corrected sample text by: detecting a sample error word in the sample text, determining a sample phonetic symbol corresponding to the sample error word in the sample phonetic symbol sequence, and adding a sample phonetic feature corresponding to the sample phonetic symbol behind the sample error word to obtain a sample phonetic symbol text, and correcting the sample error word and the sample phonetic feature in the sample phonetic symbol text to obtain the corrected sample text.

The first generating module 1003 is configured to generate a first loss value based on the sample text, the corrected sample text, and the target text.

The training module 1004 is configured to obtain a text correction model by training the text correction model to be trained based on the first loss value.

It should be noted that the foregoing explanation of the embodiment of a method for generating a text correction model is also applied to an apparatus for generating a text correction model in the embodiment, which will not be repeated here.

In summary, with the apparatus for generating a text correction model in the embodiment of the disclosure, the sample text and the corresponding sample phonetic symbol sequence are input into a text correction model to be trained, the text correction model to be trained obtains a corrected sample text by detecting a sample error word in the sample text, determining a sample phonetic symbol corresponding to the sample error word in the sample phonetic symbol sequence, adding a sample phonetic feature corresponding to the sample phonetic symbol behind the sample error word to obtain a sample phonetic symbol text, and correcting the sample error word and the sample phonetic feature in the sample phonetic symbol text, a first loss value is generated based on the sample text, the corrected sample text, and the target text, and a text correct model is obtained by training the text correction model to be trained based on the first loss value. In the apparatus for generating a text correction model in the embodiment, the corrected sample text is obtained by inputting the sample text and the sample phonetic symbol sequence into the text correction model to be trained, the first loss value is generated based on the corrected sample text and the target text, and the text correction model is obtained by training the model to be trained based on the first loss value. The text correction model has a rapid correction speed. In consideration of pronunciation information, the accuracy of the corrected result is relatively high, and a varying-length correction may be processed, which further improves the accuracy of the corrected result and makes the training of the text correction model more accurate and efficient.

Figure 11:
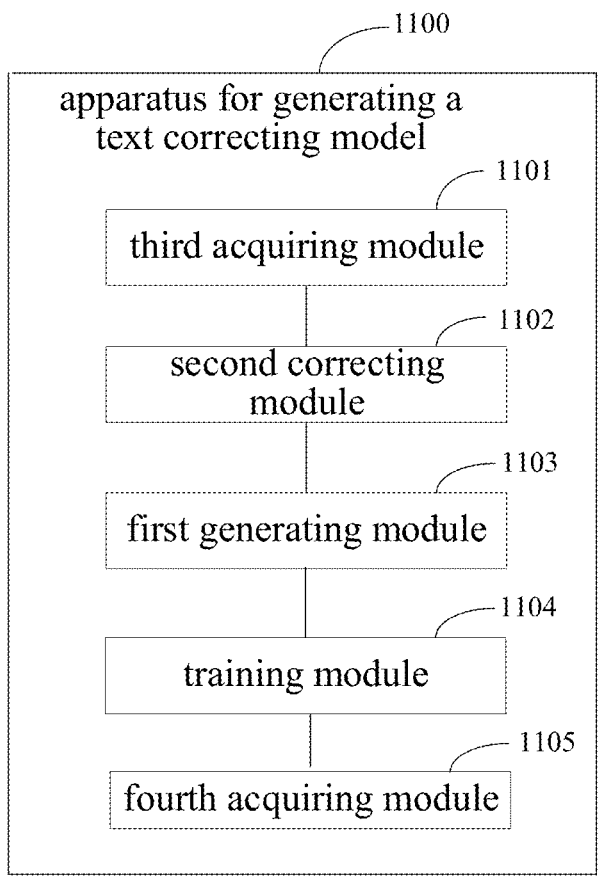
FIG. 11 is a block diagram of an apparatus for generating a text correction model according to a second embodiment of the disclosure.

FIG. 11 is a block diagram of an apparatus for generating a text correction model according to a second embodiment of the disclosure. As illustrated in FIG. 11, the apparatus for generating a text correction model may include a third acquiring module 1101, a second correcting module 1102, a first generating module 1103 and a training module 1104.

The third acquiring module 1101 has the same structure and function as the third acquiring module 1001 in the above embodiment, the second correcting module 1102 has the same structure and function as the second correcting module 1002 in the above embodiment, the first generating module 1103 has the same structure and function as the first generating module 1003 in the above embodiment, and the training module 1104 has the same structure and function as the training module 1004 in the above embodiment.

The text correction model to be trained detects the sample error word in the sample text by: obtaining a sample error tagging sequence by performing error word detection on the sample text; and determining the sample error word in the sample text based on the sample error tagging sequence.

The text correction model to be trained corrects the sample error word and the sample phonetic feature in the sample phonetic symbol text by the followings to obtain the corrected sample text: obtaining a sample candidate correction text by correcting the sample error word and the sample phonetic feature in the sample phonetic symbol text; and obtaining the corrected sample text by performing de-duplication processing on the sample candidate correction text.

Further, the apparatus 1100 for generating a text correction model specifically further may include a fourth acquiring module 1104 configured to acquire a target phonetic symbol text of the sample text; the first generating module 1103 specifically may include a first generating unit, configured to generate a second loss value based on the sample text, the sample phonetic symbol text and the target phonetic symbol text; a second generating unit, configured to generate a third loss value based on the target phonetic symbol text, the corrected sample text, and the target text; and a third generating unit, configured to generate the first loss value based on the second loss value and the third loss value.

It should be noted that the foregoing explanation of the embodiment of a method for generating a text correction model is also applied to an apparatus for generating a text correction model in the embodiment, which will not be repeated here.

In summary, with the apparatus for generating a text correction model in the embodiment of the disclosure, the sample text and the corresponding sample phonetic symbol sequence are inputted into a text correction model to be trained. The text correction model to be trained performs error word detection on the sample text to obtain a sample error tagging sequence, determines an error word in the sample text based on the sample error tagging sequence, determines a sample phonetic symbol corresponding to the sample error word in the sample phonetic symbol sequence, determines a sample phonetic symbol text by adding a sample phonetic feature corresponding to the sample phonetic symbol behind the sample error word, obtains a sample candidate correction text by correcting the sample error word and the sample phonetic feature in the sample phonetic symbol text, and obtains a corrected sample text by performing de-duplication processing on the sample candidate correction text. A first loss value is generated based on the corrected sample text, and the target text, a target phonetic symbol text of the sample text is acquired, a second loss value is generated based on the sample phonetic symbol text and the target phonetic symbol text, a third loss value is generated based on the first loss value and the second loss value, and the text correction model to be trained is trained based on the third loss value to obtain a text correction model. In the apparatus for generating a text correction model in the embodiment, the corrected sample text is obtained by inputting the sample text and the sample phonetic symbol sequence into a text correction model to be trained, the first loss value is generated based on the corrected sample text and the target text, and the text correction model is obtained by training a model to be trained based on the first loss value. The text correction model has a rapid correction speed. In consideration of pronunciation information, the accuracy of the corrected result is relatively high, and a varying-length correction may be processed, which further improves the accuracy of the corrected result, and makes the training of the text correction model more accurate and efficient. At the same time, the phonetic symbol corresponding to the error word in the phonetic symbol sequence is determined by performing error word detection on the sample text and the corrected sample text is obtained by correcting and performing de-duplication processing, which avoids repetition in a corrected result, and further improves a correction speed and accuracy of the corrected result, and makes the training of a text correction model more accurate and efficient.

Collection, storage, use, processing, transmission, provision and disclosure of the user personal information involved in the technical solution of the disclosure comply with relevant laws and regulations, and do not violate public order and good customs.

According to the embodiment of the disclosure, an electronic device, a readable storage medium and a computer program product are further provided in the disclosure.

Figure 12:
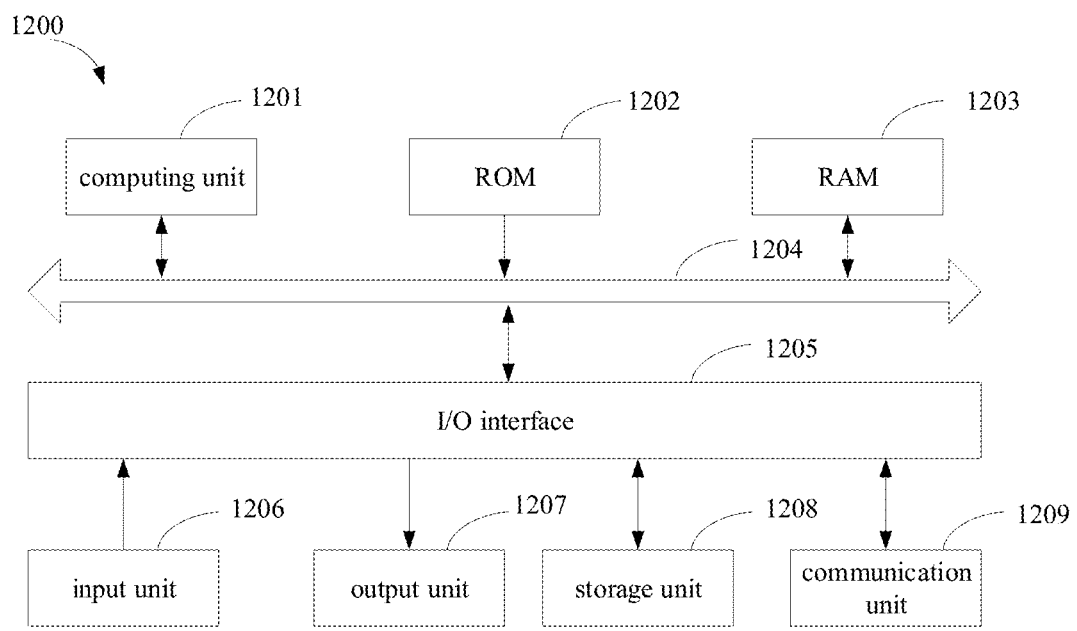
FIG. 12 is a block diagram of an electronic device configured to implement a method for correcting a text or a method for generating a text correction model in the embodiment of the disclosure.

FIG. 12 is a schematic block diagram illustrating an example electronic device 1200 in the embodiment of the present disclosure. An electronic device is intended to represent various types of digital computers, such as laptop computers, desktop computers, workstations, personal digital assistants, servers, blade servers, mainframe computers, and other suitable computers. An electronic device may also represent various types of mobile apparatuses, such as personal digital assistants, cellular phones, smart phones, wearable devices, and other similar computing devices.

The components shown herein, their connections and relations, and their functions are merely examples, and are not intended to limit the implementation of the disclosure described and/or required herein.

As illustrated in FIG. 12, the electronic device 1200 includes a computing unit 1201, which may execute various appropriate actions and processings based on a computer program stored in a read-only memory (ROM) 1202 or a computer program loaded into a random access memory (RAM) 1203 from a storage unit 1208. In the RAM 1203, various programs and data required for operation of the electronic device 1200 may also be stored. A computing unit 1201, a ROM 1202 and a RAM 1203 may be connected to each other by a bus 1204. An input/output (I/O) interface 1205 is also connected to a bus 1204.

A plurality of components in the electronic device 1200 are connected to an I/O interface 1205, and includes: an input unit 1206, for example, a keyboard, a mouse, etc.; an output unit 1207, for example various types of displays, speakers; a memory unit 1208, for example a magnetic disk, an optical disk; and a communication unit 1209, for example, a network card, a modem, a wireless transceiver. A communication unit 1209 allows the electronic device 1200 to exchange information/data through a computer network such as internet and/or various types of telecommunication networks and other devices.

A computing unit 1201 may be various types of general and/or dedicated processing components with processing and computing ability. Some examples of a computing unit 1201 include but not limited to a central processing unit (CPU), a graphics processing unit (GPU), various dedicated artificial intelligence (AI) computing chips, various computing units running a machine learning model algorithm, a digital signal processor (DSP), and any appropriate processor, controller, microcontroller, etc. A computing unit 1201 performs various methods and processings as described above, for example, methods for correcting a text as illustrated in FIG. 1 to FIG. 4 or methods for generating a text correction model as illustrated in FIG. 5 to FIG. 7. For example, in some embodiments, the method for correcting a text or the method for generating a text correction model may be further achieved as a computer software program, which is physically contained in a machine readable medium, such as a storage unit 1208. In some embodiments, some or all of the computer programs may be loaded and/or mounted on the electronic device 1200 via a ROM 1202 and/or a communication unit 1209. When the computer program is loaded on a RAM 1203 and executed by a computing unit 1201, one or more blocks in the method for correcting a text or the method for generating a text correction model as described above may be performed. Alternatively, in other embodiments, the computing unit 1201 may be configured to perform a method for correcting a text or a method for generating a text correction model in other appropriate ways (for example, by virtue of a firmware).

Various implementation modes of the systems and technologies described above may be implemented in a digital electronic circuit system, a field programmable gate array (FPGA), an application-specific integrated circuit (ASIC), an application specific standard product (ASSP), a system-on-chip (SOC) system, a complex programmable logic device, a computer hardware, a firmware, a software, and/or combinations thereof. The various implementation modes may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input apparatus, and at least one output apparatus, and transmit the data and instructions to the storage system, the at least one input apparatus, and the at least one output apparatus.

A computer code configured to execute a method in the present disclosure may be written with one or any combination of a plurality of programming languages. The programming languages may be provided to a processor or a controller of a general purpose computer, a dedicated computer, or other programmable apparatuses for correcting a text, so that the function/operation specified in the flowchart and/or block diagram may be performed when the program code is executed by the processor or controller. A computer code may be performed completely or partly on the machine, performed partly on the machine as an independent software package and performed partly or completely on the remote machine or server.

In the context of the disclosure, a machine-readable medium may be a tangible medium that may contain or store a program intended for use in or in conjunction with an instruction execution system, apparatus, or device. A machine readable medium may be a machine readable signal medium or a machine readable storage medium. A machine readable storage medium may include but not limited to an electronic, magnetic, optical, electromagnetic, infrared, or semiconductor system, apparatus or device, or any appropriate combination thereof. A more specific example of a machine readable storage medium includes an electronic connector with one or more cables, a portable computer disk, a hardware, a random access memory (RAM), a read-only memory (ROM), an erasable programmable read-only memory (an EPROM or a flash memory), an optical fiber device, and a portable optical disk read-only memory (CDROM), an optical storage device, a magnetic storage device, or any appropriate combination of the above.

In order to provide interaction with a user, the systems and technologies described here may be implemented on a computer, and the computer has: a display apparatus for displaying information to a user (for example, a CRT (cathode ray tube) or a LCD (liquid crystal display) monitor); and a keyboard and a pointing apparatus (for example, a mouse or a trackball) through which the user may provide input to the computer. Other types of apparatuses may further be configured to provide interaction with the user; for example, the feedback provided to the user may be any form of sensory feedback (for example, visual feedback, auditory feedback, or tactile feedback); and input from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphical user interface or a web browser through which the user may interact with the implementation mode of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), an internet and a blockchain network.

The computer system may include a client and a server. The client and server are generally far away from each other and generally interact with each other through a communication network.

The relationship between the client and the server is generated by computer programs running on the corresponding computer and having a client-server relationship with each other. A server may be a cloud server, also known as a cloud computing server or a cloud host, is a host product in a cloud computing service system, to solve the shortcomings of large management difficulty and weak business expansibility existed in the conventional physical host and Virtual Private Server (VPS) service. A server further may be a server with a distributed system, or a server in combination with a blockchain.

According to an embodiment of the disclosure, a computer program product including a computer program is further provided in the disclosure, the computer program is configured to perform the blocks of the method for correcting a text or the method for generating a text correction model as described in the above embodiment when performed by a processor.

It should be understood that, various forms of procedures shown above may be configured to reorder, add or delete blocks. For example, blocks described in the disclosure may be performed in parallel, sequentially, or in a different order, as long as the desired result of the technical solution disclosed in the present disclosure may be achieved, which will not be limited herein.

The above specific embodiments do not constitute a limitation on the scope of protection of the present disclosure. Those skilled in the art should understand that various modifications, combinations, sub combinations and substitutions can be made according to design requirements and other factors. Any modification, equivalent replacement and improvement made within the spirit and principles of this disclosure shall be included in the scope of protection of this disclosure.

What is claimed is:

1. A method for correcting a text, comprising:
acquiring a text to be corrected;
acquiring a phonetic symbol sequence of the text to be corrected; and
obtaining a corrected text by inputting the text to be corrected and the phonetic symbol sequence into a text correction model, wherein, the text correction model obtains the corrected text by: detecting an error word in the text to be corrected, determining a phonetic symbol corresponding to the error word in the phonetic symbol sequence, and adding a phonetic feature corresponding to the phonetic symbol behind the error word to obtain a phonetic symbol text, and correcting the error word and the phonetic feature in the phonetic symbol text to obtain the corrected text;
wherein, the text correction model comprises an error detection submodel and an error correction submodel, each of the error detection submodel and the error correction submodel comprises one encoder and one decoder, and the two submodels share the one encoder; the error detection submodel performs encoding and a binary classification mapping on a vector representation of the input sample text to obtain a binary classification result; the error correction submodel performs encoding and one classification mapping on the vector representation of the input sample phonetic symbol text to obtain a corrected result;
wherein, the text correction model corrects the error word and the phonetic feature in the phonetic symbol text by the following to obtain the corrected text:
obtaining a candidate correction text by correcting the error word and the phonetic feature in the phonetic symbol text; and
obtaining the corrected text by performing de-duplication processing on the candidate correction text.

2. The method of claim 1, wherein, the text correction model detects the error word in the text to be corrected by:
obtaining an error tagging sequence by performing error word detection on the text to be corrected; and
determining the error word in the text to be corrected based on the error tagging sequence.

3. A method for generating a text correction model, comprising:
acquiring a sample text, a sample phonetic symbol sequence of the sample text, and a target text of the sample text;
obtaining a corrected sample text by inputting the sample text and the sample phonetic symbol sequence into a text correction model to be trained, wherein, the text correction model to be trained obtains the corrected sample text by: detecting a sample error word in the sample text, determining a sample phonetic symbol corresponding to the sample error word in the sample phonetic symbol sequence, and adding a sample phonetic feature corresponding to the sample phonetic symbol behind the sample error word to obtain a sample phonetic symbol text, and correcting the sample error word and the sample phonetic feature in the sample phonetic symbol text to obtain the corrected sample text;
generating a first loss value based on the sample text, the corrected sample text, and the target text; and
obtaining a final text correction model by training the text correction model to be trained based on the first loss value;
wherein, the text correction model comprises an error detection submodel and an error correction submodel, each of the error detection submodel and the error correction submodel comprises one encoder and one decoder, and the two submodels share the one encoder; the error detection submodel performs encoding and a binary classification mapping on a vector representation of the input sample text to obtain a binary classification result; the error correction submodel performs encoding and one classification mapping on the vector representation of the input sample phonetic symbol text to obtain a corrected result;

wherein, the text correction model to be trained corrects the sample error word and the sample phonetic feature in the sample phonetic symbol text by the following to obtain the corrected sample text:
  obtaining a sample candidate correction text by correcting the sample error word and the sample phonetic feature in the sample phonetic symbol text; and
  obtaining the corrected sample text by performing de-duplication processing on the sample candidate correction text.

4. The method of claim 3, wherein, the text correction model to be trained detects the sample error word in the sample text by:
  obtaining a sample error tagging sequence by performing error word detection on the sample text; and
  determining the sample error word in the sample text based on the sample error tagging sequence.

5. The method of claim 3, further comprising:
  acquiring a target phonetic symbol text of the sample text;
  wherein generating the first loss value based on the sample text, the corrected sample text, and the target text, comprises:
    generating a second loss value based on the sample text, the sample phonetic symbol text and the target phonetic symbol text;
    generating a third loss value based on the target phonetic symbol text, the corrected sample text, and the target text; and
    generating the first loss value based on the second loss value and the third loss value.

6. An electronic device, comprising:
  at least one processor; and
  a memory communicatively connected to the at least one processor;
  wherein the memory is stored with instructions executable by the at least one processor, and when the instructions are performed by the at least one processor, the at least one processor is caused to perform the method of claim 3.

7. An electronic device, comprising:
  at least one processor; and
  a memory communicatively connected to the at least one processor;
  wherein the memory is stored with instructions executable by the at least one processor, and when the instructions are performed by the at least one processor, the at least one processor is caused to perform the following:
  acquiring a text to be corrected;
  acquiring a phonetic symbol sequence of the text to be corrected; and
  obtaining a corrected text by inputting the text to be corrected and the phonetic symbol sequence into a text correction model, wherein, the text correction model obtains the corrected text by: detecting an error word in the text to be corrected, determining a phonetic symbol corresponding to the error word in the phonetic symbol sequence, and adding a phonetic feature corresponding to the phonetic symbol behind the error word to obtain a phonetic symbol text, and correcting the error word and the phonetic feature in the phonetic symbol text to obtain the corrected text;
  wherein, the text correction model comprises an error detection submodel and an error correction submodel, each of the error detection submodel and the error correction submodel comprises one encoder and one decoder, and the two submodels share the one encoder; the error detection submodel performs encoding and a binary classification mapping on a vector representation of the input sample text to obtain a binary classification result; the error correction submodel performs encoding and one classification mapping on the vector representation of the input sample phonetic symbol text to obtain a corrected result;
  wherein, the text correction model corrects the error word and the phonetic feature in the phonetic symbol text by the following to obtain the corrected text:
    obtaining a candidate correction text by correcting the error word and the phonetic feature in the phonetic symbol text; and
    obtaining the corrected text by performing de-duplication processing on the candidate correction text.

8. The electronic device of claim 7, wherein, the text correction model detects the error word in the text to be corrected by:
  obtaining an error tagging sequence by performing error word detection on the text to be corrected; and
  determining the error word in the text to be corrected based on the error tagging sequence.

* * * * *